J. LEDWINKA.
MULTIPLE SPOT WELDING MACHINE.
APPLICATION FILED JAN. 10, 1917.

1,269,617.

Patented June 18, 1918.
6 SHEETS—SHEET 1.

Fig. 1.

J. LEDWINKA.
MULTIPLE SPOT WELDING MACHINE.
APPLICATION FILED JAN. 10, 1917.

1,269,617.

Patented June 18, 1918.
6 SHEETS—SHEET 4.

J. LEDWINKA.
MULTIPLE SPOT WELDING MACHINE.
APPLICATION FILED JAN. 10, 1917.

1,269,617.

Patented June 18, 1918.
6 SHEETS—SHEET 6.

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

MULTIPLE SPOT-WELDING MACHINE.

1,269,617.  Specification of Letters Patent.  Patented June 18, 1918.

Application filed January 10, 1917. Serial No. 141,641.

*To all whom it may concern:*

Be it known that I, JOSEPH LEDWINKA, a citizen of the United States, residing at Philadelphia, in the county of Philadelphia and State of Pennsylvania, have invented new and useful Improvements in Multiple Spot-Welding Machines, of which the following is a specification.

This invention relates to welding machines.

One object of the invention is to provide means to produce a multiplicity of spot welds expeditiously.

Another object is to provide means for so applying the electrodes to the work that the members to be welded will not buckle.

Another object is to provide means for minimizing the consumption of electrical energy.

A still further object is to provide means for insuring that the cycle of operations will take place in a predetermined sequence.

Other objects will appear as the specification proceeds.

Several forms of the machine are illustrated in the accompanying drawings in which:—

A machine constructed in accordance with the invention may take various different forms. Several different forms are illustrated in the drawings for exemplary purposes and these forms will be specifically described.

The machine comprises, in general, a multiplicity of pairs of electrodes between which the members to be welded may be placed. The electrodes on one side of the work are relatively fixed and those on the other side are individually movable and are spring pressed toward the work. The tension of the springs associated with the individually movable electrodes may be adjusted to regulate the pressure which the electrodes exert upon the work. Means are provided for bringing the electrodes on one side of the joint to be welded, into contact with the joint one after the other, or, in other words, in a predetermined succession. This is to prevent wrinkling or buckling of the members to be welded, such as might occur if all of the electrodes where brought simultaneously into contact with the joint. If all of the welds are made simultaneously a heavy current would be required and therefore means are provided for passing current through the pairs of electrodes successively.

Figure 1:
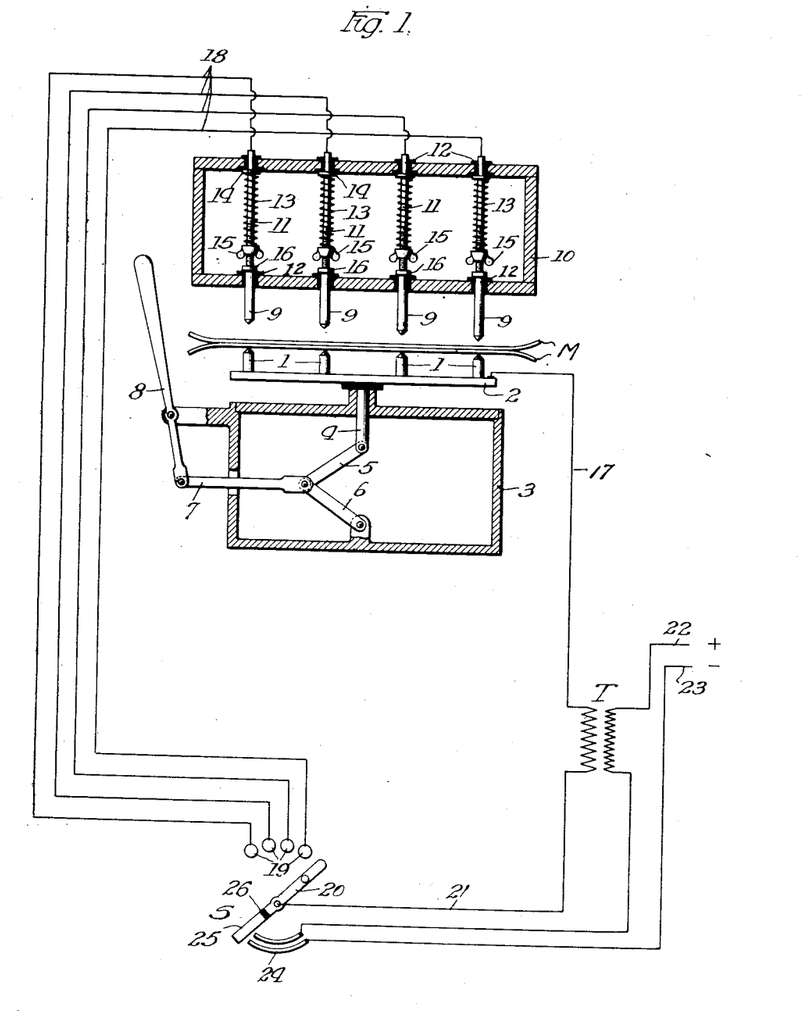
Figure 1 is a diagrammatic view of one form of machine constructed in accordance with the invention.

Fig. 1 diagrammatically represents one form of machine constructed in accordance with the invention and illustrates the principles of construction and operation of all of the different forms herein disclosed.

In Fig. 1 a series of electrodes 1 are mounted upon a support 2, which may be raised and lowered in a suitable frame-work 3. For this purpose the support 2 may carry a depending rod 4 which is slidably mounted in the frame-work 3. A pair of toggle links 5 and 6 which are actuated by means of the link 7 and lever 8 serve to raise and lower the support 2.

A series of individually movable electrodes 9 are mounted in a suitable framework 10 positioned above the lower framework 3. Each of these electrodes 9 is connected with a rod 11, and the rods and electrodes are slidably mounted in the framework 10. The rods 11 and electrodes 9 are insulated from the frame-work 10 by insulating bushings 12. Each electrode 9 is spring pressed and yieldingly urged toward its extreme downward position by means of a spring 13 reacting at one end against a washer 14 which is loosely mounted upon the rod 11, and which abuts against the upper portion of the frame-work 10. The lower end of each spring 13 bears against a thumb-nut 15 which is threaded upon the rod 11. The tension of the springs 13 may be adjusted by turning the thumb-nuts 15. The downward movement of each electrode 9 is limited by means of a shoulder 16. It is now clear that each electrode 9 may be moved upwardly against the action of the corresponding spring 13. The electrodes 9 successively decrease in length from the right to the left so that when the support 2 is moved upwardly the electrodes 9 will come into contact with the work one after another.

The support 2 is insulated from the rod 4 and framework 3 and is connected by means of a conductor 17 to the secondary of a transformer represented diagrammatically at T. Each electrode 9 is electrically connected by means of a conductor 18 to one of the contacts 19 of a switch denoted generally at S. The switch arm 20 of this switch is electrically connected by means of the conductor 21 to the secondary of the transformer T.

The primary of the transformer T is connected to the positive and negative mains 22 and 23 of a supply line through a pair of segmental contacts 24. These segmental contacts 24 are so associated with the switch S that they may be bridged by an extension 25 on the switch arm 20, said extension being insulated from the switch arm as shown at 26.

In operation the members M to be united are placed upon the lower electrodes 1 and the lever 8 is then actuated to raise the support 2. As the electrodes 9 are of different lengths they will contact with the work one after another, the longest electrode 9 making contact with the work first and then the next electrode making contact with the work, and so on. In this way the electrodes 9 contact with the work successively and prevent wrinkling or buckling of the members, such as might occur if all of the electrodes 9 were made to simultaneously contact with the work. It will be understood that as the electrodes 9 contact with the work these electrodes are moved upwardly against the tension of the springs 13 and it is therefore the tension of the springs which determines the pressure exerted by the electrodes upon the work. After the electrodes are thus brought into proper contact with the members to be welded the switch S is actuated to move the switch arm 20 to the left. The segmental contacts 24 are so positioned with respect to the extension 25 and the first contact 19 that the circuit of the primary of the transformer will be completed before the switch arm 20 makes engagement with the first contact 19. Further movement of the switch arm 20 will then complete the circuit of the secondary through the first contact 19 of the switch and through the first pair of electrodes. The circuit may be traced as follows: from the secondary of the transformer through the conductor 21, switch arm 20, first contact 19, through the corresponding conductor 18, through the right-hand pair of electrodes, and then through the conductor 17 back to the secondary of the transformer. A spot weld will therefore be produced by the right-hand pair of electrodes. The switch arm 20 is then moved over the remaining contacts 19 and current is passed through the remaining pairs of electrodes successively. The last contact 19 is so arranged that the circuit of the primary of the transformer will be broken by the extension 25 leaving the segmental contacts 24 before the switch arm 20 leaves the last contact 19. This will prevent arcing at the last contact 19 such as would result from the high amperage in the secondary if the primary circuit was not first broken.

Figure 2:
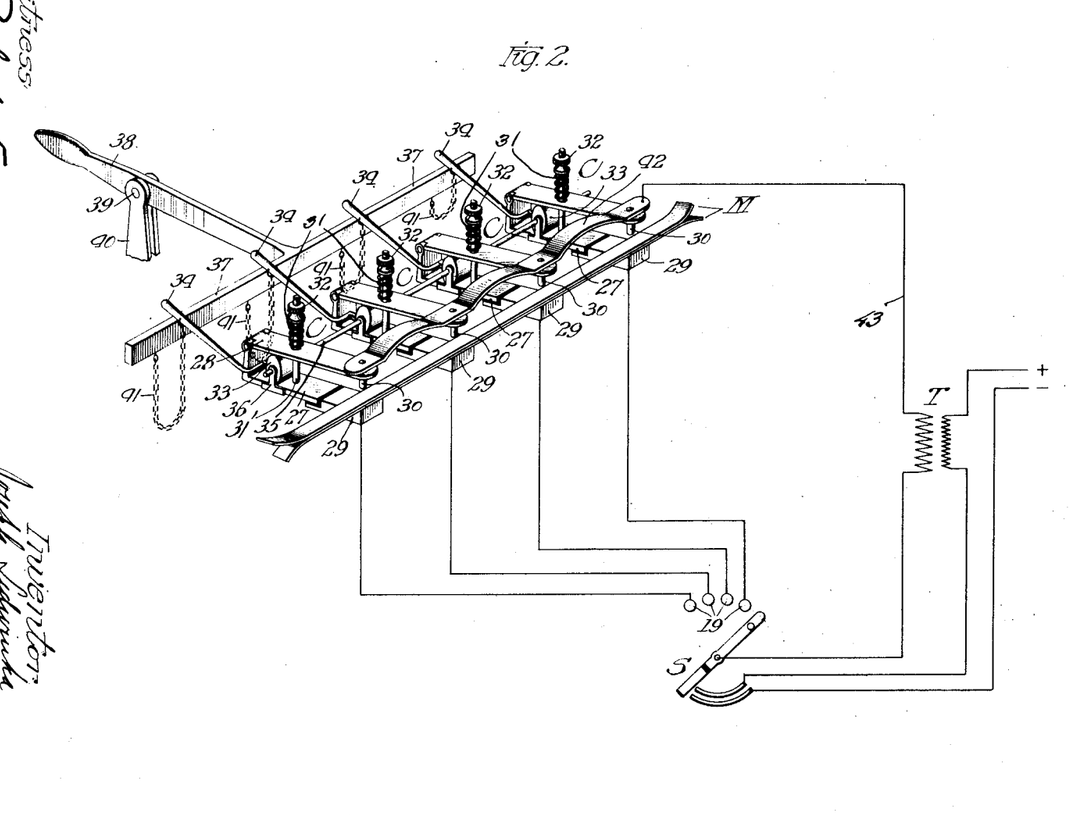
Fig. 2 is a perspective view of a different form of welding machine showing the electrical appurtenances and circuits diagrammatically.

Fig. 2 illustrates a different form of machine in which a plurality of clamps denoted generally at C are employed. Each of these clamps comprises a lower stationary section 27 and an upper section 28 hingedly connected to said lower section. Each of the lower sections 27 of the clamp C carries an electrode 29 which is insulated therefrom and each upper section 28 carries an electrode 30 which is insulated from the upper section. A rod 31' secured to the lower section 27 of the clamp passes upwardly through the hinged section 28 and is encircled by a spring 31 reacting at its upper end against an adjustable thumb-nut 32 which is threaded upon the rod 30'. The lower end of the spring 31 acts upon the upper surface of the hinged section 28 of the clamp. The spring 31 therefore tends to yieldingly urge the hinged section of the clamp toward the lower section of the clamp to bring the electrodes 29 and 30 into operative relation. This movement of the members of the clamp, however, is normally prevented by means of a cam 33 having associated therewith a lever 34 which projects rearwardly from the clamp. All of the cams 33 may be loosely mounted upon a rod 35 supported by brackets 36.

All of the levers 34 normally rest upon the upper edge of a bar 27 which may be raised and lowered by a handle 38 pivoted at 39 to a suitable bracket 40.

Each lever 34 is connected by means of a chain 41 to the bar 36. These chains are of different lengths and successively increase in length from the chain at the right side of the machine to the chain at the left side of the machine.

The upper electrodes 30 are electrically connected by means of a copper strip 42 which is insulated from the hinged sections 28 of the clamps. This copper strip is connected by means of a conductor 43 to the secondary of the transformer T. The other side of the secondary of the transformer is connected to a switch S in the same manner as described in connection with Fig. 1, and the electrodes 29 are connected with the several contacts 19 of the switch S in the same manner as electrodes 29 in Fig. 1 are connected with the corresponding switch contacts.

In the normal position of the parts, the cams 33 hold the hinged sections 28 in their raised position against the tension of the springs 31. The electrodes 30 are therefore out of operative relation with the electrodes 29.

In operation the members M to be welded are placed on the electrodes 29 and the handle 38 is raised so as to lower the bar 37. This will lower the levers 34 successively due to the fact that the bar 37 is connected with these levers by chains of different lengths. This will successively shift the position of the cams 33 and allow the springs 31 to move the hinged sections 28 of the clamps downwardly in succession. The electrodes 30 will therefore successively move into contact with the work and prevent buckling or wrinkling of the members M. The switch S is then actuated to supply current to the pairs of electrodes in the same manner as described above in connection with Fig. 1. By depressing the handle 38 the bar 37 is raised and contacts with the levers 34 thereby lifting said levers and rocking the cams 33 to open the clamps and separate the electrodes.

Figure 3:
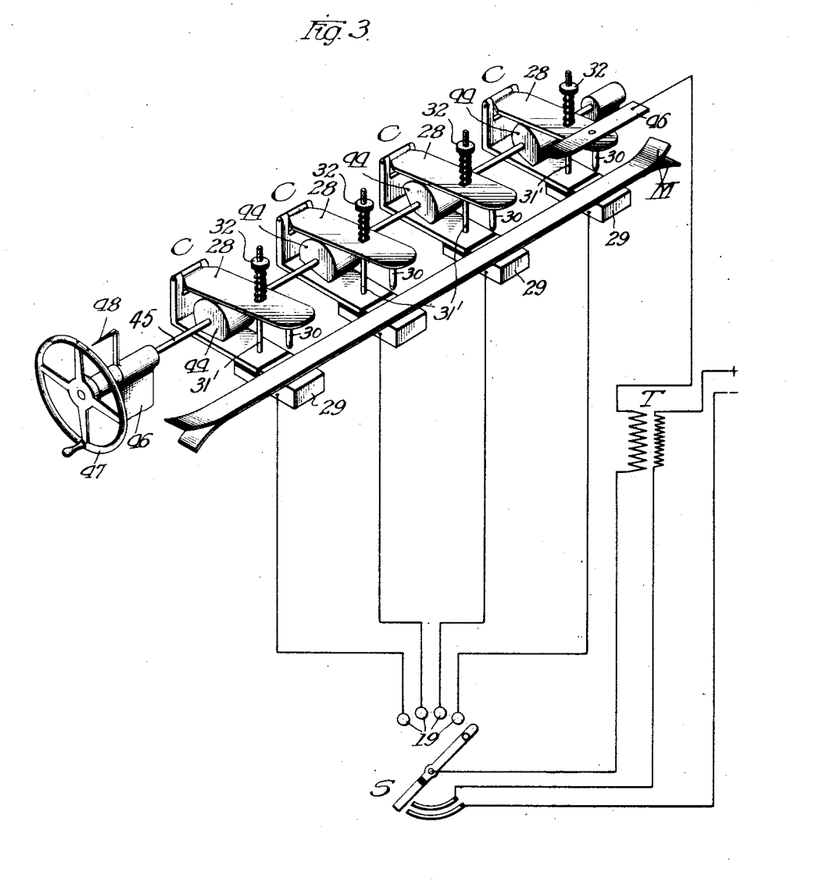
Fig. 3 is a perspective view of a portion of the machine shown in Fig. 2 illustrating different means for actuating the clamps.

Fig. 3 shows a portion of the machine illustrated in Fig. 2 and illustrates the use of cams having different shapes for successively lowering the upper sections 28 in place of the chain mechanism described above. Between the upper and lower sections of each clamp is placed a cam 44. All of the cams may be mounted upon a common shaft 45 which is journaled to rotate in the bearing brackets 46. The shaft 45 is rotated by means of a hand-wheel 47.

The cams 44 are so shaped with respect to each other that as the shaft 45 is turned the first cam will permit the upper section of the right-hand clamp to lower while the remaining clamps stay in their normal position. Further movement of the shaft 35 will then cause the second cam to permit the upper section of the second clamp to lower. Still further movement of the shaft 45 will permit the upper section of the third clamp to descend and upon further movement of the shaft 35 the upper section of the last clamp will descend. At this stage all of the upper sections of the clamps are in their lowermost positions and the electrodes carried thereby are in operative relation with the electrodes associated with the lower sections of the clamps. It will be noted that the cams 44 are so shaped that a slight further movement of the shaft 45 will then simultaneously raise all of the upper sections of the clamps.

A stationary pointer 48 coöperates with suitable indications on the hand wheel 47 to indicate the different positions of the shaft at which the upper sections of the clamps are lowered.

The electrodes are connected with the switch S of the transformer in the same manner as in the forms described above and the operation is in general similar to the operation of the other forms of the machine. The hand-wheel 47 is turned as described above to permit the upper sections of the clamps to lower successively and to bring the electrodes carried thereby into contact with the work successively to prevent wrinkling or buckling of the members M. Current is then supplied by means of the switch S to the several pairs of electrodes successively. After the welding operation a slight movement of the hand-wheel 47 will simultaneously raise all of the upper sections of the clamps so that the united members may be removed.

Figs. 4 to 9, inclusive, illustrate a machine which is especially constructed for welding together curved members, such as curved parts of an automobile body. In these figures a table-like supporting structure is denoted generally at 49. Upon this structure is mounted a semicircular series of bearing blocks 50. To one portion of each of the blocks 50 is secured an upstanding arm 51, to the upper portion of which is secured a stationary electrode 52. Each of these electrodes 52 is insulated from its corresponding arm 51 by means of the insulating material 53.

Conductor sections 54 are electrically connected by means of the bridge members 55 and are positioned adjacent the stationary electrodes 52. Current is supplied to each stationary electrode 52 from the sections 54 by means of electrical conductors 56. The conductor sections 54 are electrically connected by means of a conductor 57 to the secondary of the transformer T.

A second arm 58 is pivoted to each bearing block 50 and extends upwardly in substantial parallelism with the corresponding arm 51 carrying the stationary electrode. Each of the arms 58 is insulated from but connected to a head 59 in which there is secured an electrode 60 which is adapted to coöperate with the corresponding stationary electrode 52.

Each head 59 is electrically connected by means of a conductor 60 to one conducting section 61 of a stationary commutator ring, denoted generally at R. The conducting sections 61 of the commutator ring are insulated from each other as shown at 62.

Figure 6:
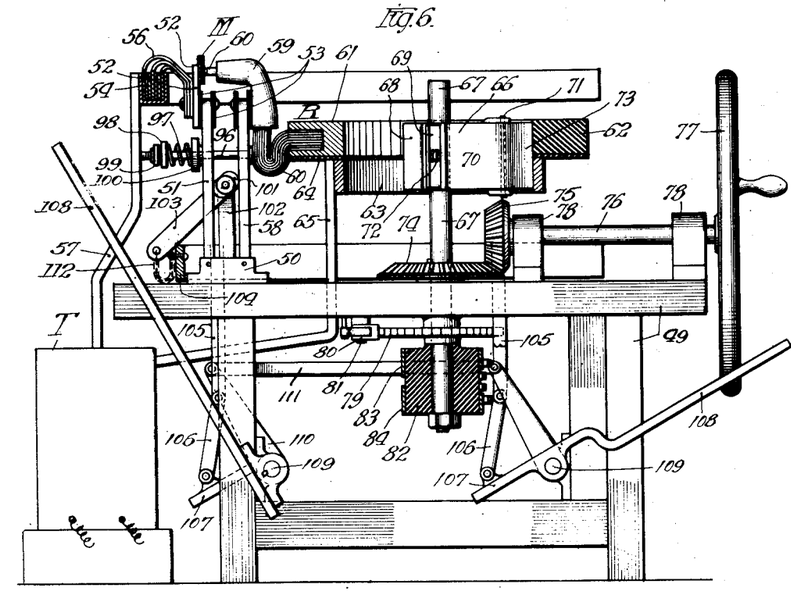
Fig. 6 is a side elevation of the machine shown in Fig. 4 with certain parts in section.
Figure 7:
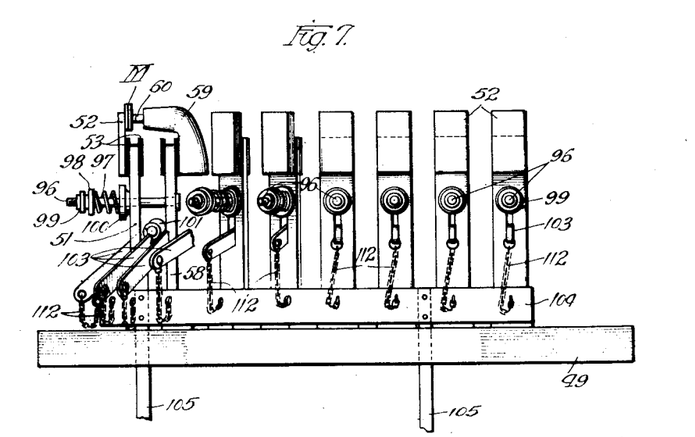
Fig. 7 is a side elevation of the upper part of the machine shown in Fig. 4.

A circular conducting ring 63 is positioned below and supports the commutator ring R and is insulated therefrom by the strip 64 of insulating material (see Fig. 6). Standards 63' (Fig. 5) serve to support the conducting ring 63. The conducting ring 63 is electrically connected by means of the conductor 65 to the secondary of the transformer.

A brush 66 is mounted upon a rotatable shaft 67 arranged in co-axial relation with the commutator ring R. This brush when rotated connects the conducting sections 61 of the commutator ring successively to the ring 63.

Figure 4:
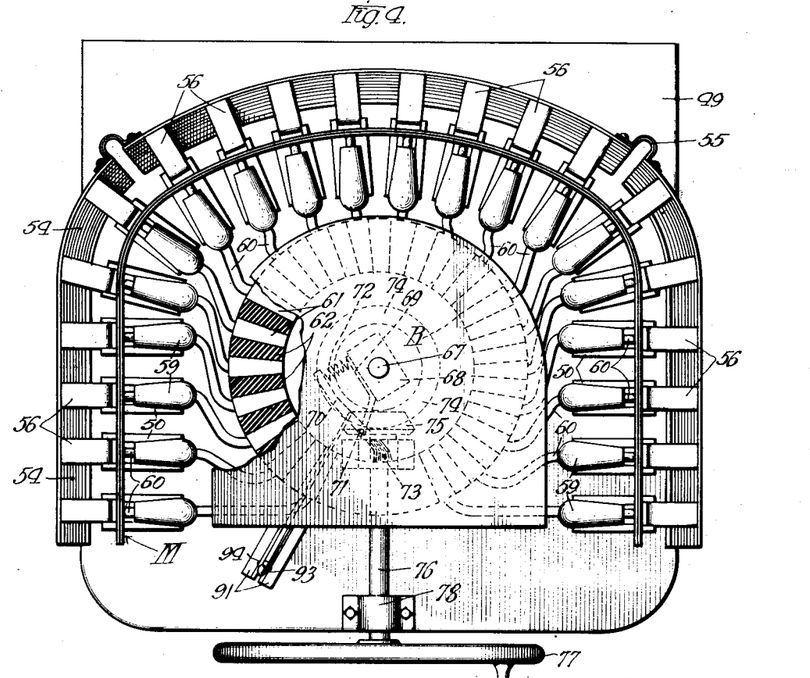
Fig. 4 is a plan view of a machine adapted to weld together curved members.
Figure 5:
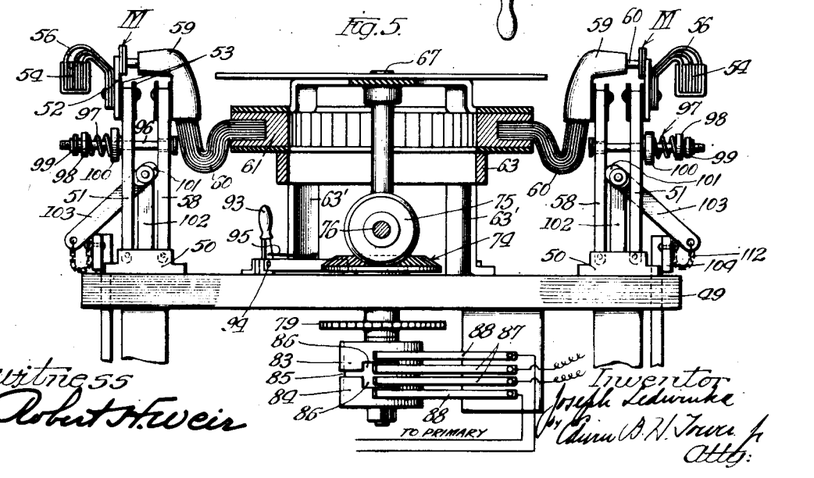
Fig. 5 is a front elevation of the structure illustrated in Fig. 4, certain parts being represented in section.

As shown in Fig. 4 the brush is mounted upon the shaft 67 by a block 68 which is secured to said shaft. The block 68 carries a bracket 69 to which the brush arm 70 is pivoted at 71. The arm 70 is normally biased by means of a spring 72 so that the brush portion 73 carried by the arm 70 will be yieldingly pressed into engagement with the inner faces of the conducting sections 61 of the commutator ring.

A gear 74 is secured to the shaft 67 and this gear meshes with a pinion 75 carried by an actuating shaft 76, carrying a hand-wheel 77. The actuating shaft 76 may be journaled in suitable bearing blocks 78 so that when the hand-wheel 77 is turned the shaft 76 will be actuated to rotate the shaft 67.

The shaft 67 also carries a ratchet wheel 79 which coöperates with a pawl 80 pivoted to the supporting structure 49. This pawl is yieldingly urged toward the ratchet wheel by means of a spring 81. The pawl and ratchet prevent rotation of the shaft 67 in the reverse direction and therefore insure that the cycle of operations will take place in a certain sequence.

An insulating cylinder 82 is secured to the lower end of the shaft 67 and upon said cylinder are positioned two conducting rings 83 and 84. These rings are separated from each other as shown at 85 and are provided along their inner edges at corresponding points with cut-out portions 86. In the normal position of the parts a pair of contact fingers 87 register with these cut-out portions 86. These fingers are connected to the positive and negative mains of the supply line. A similar finger 88 contacts with each of the ring sections 83 and 84 and these two fingers are connected with the primary of the transformer. The fingers 87 and 88 and the ring sections 83 and 84 therefore constitute a switch for controlling the supply of current to the primary of the transformer. When the hand-wheel 77 is actuated and the shaft 67 turns, the ring sections 83 and 84 will turn with said shaft and when the cut-out portions 86 pass from under the fingers 87 the ring sections 83 and 84 serve to complete the circuit to the primary of the transformer. The fingers 87 and 88 and the ring sections 83 and 84 therefore constitute a switch for cutting off the supply of current to the primary of the transformer when the machine is not in use, and for completing such circuit when the machine is started.

The switch is so arranged that the completion of the circuit to the primary of the transformer will take place before the brush 66 reaches the first commutator section. The primary circuit will therefore be completed before the circuit through the first pair of electrodes is completed. Furthermore the switch is so arranged that the circuit to the primary of the transformer will be broken before the brush 66 leaves the last commutator section. Hence sparking at the commutator is prevented.

Figure 8:
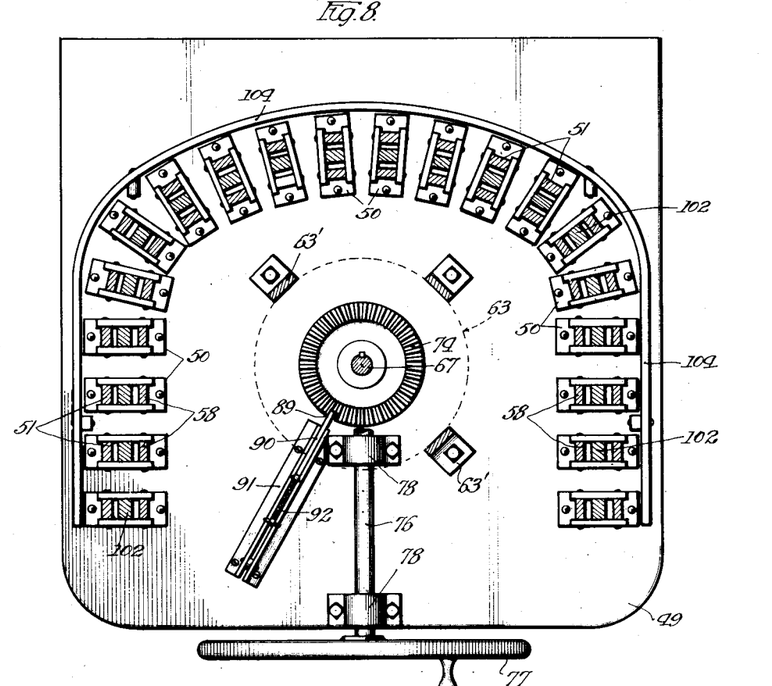
Fig. 8 is a horizontal section taken on the line 8—8 of Fig. 5.
Figure 9:
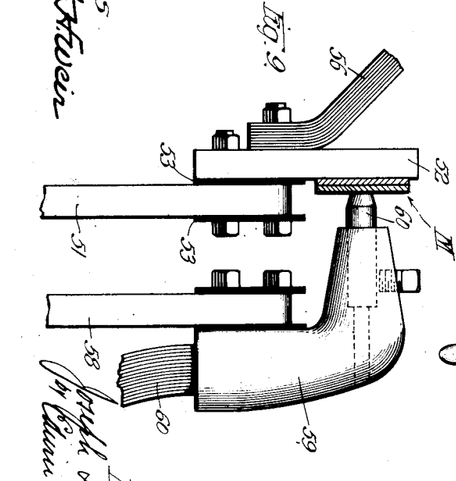
Fig. 9 is a side elevation of one of the stationary electrodes and one of the movable electrodes employed in the machine shown in Fig. 4.

The gear 74 is provided with a notch 89 as shown in Fig. 8. In the normal position of the parts the extremity of a sliding pin 90 engages in this notch to lock the gear against rotation. The pin 90 slides in a guideway 91 mounted upon the supporting structure 49. This pin is yieldingly urged toward the gear 74 by means of a spring 92 but it may be withdrawn by means of a hand lever 93 which is pivoted at 94 and connected with said pin by means of a link 95. When the extremity of the pin 90 engages in the notch 89 the machine is locked against operation but when the pin is withdrawn from engagment with the notch 89 by the hand lever 93 the parts are unlocked and after the machine is started the end of the pin 90 will bear against the outer edge of the gear wheel 94. When the machine has performed one cycle of operations, or in other words, when the notch 89 returns to its position adjacent the pin 90, the pin will snap into the notch 89 and thereby lock the machine in its inoperative position in which no current flows through the primary of the transformer to the electrodes. Waste of electrical energy is therefore prevented.

Each pivoted arm 58 carries a radially projecting pin 96 which projects through a corresponding opening in the adjacent arm 51. A coil spring 97 is co-axially mounted on each of the pins 96 and reacts at its outer end against a washer 98 which abuts against a thumb-nut 99 threaded upon the extremity of the pin. The inner end of the spring 97 bears against a washer 100 which in turn bears against the corresponding electrode arm 51. It is therefore evident that each pivoted arm 58 is yieldingly urged by means of the corresponding spring 97 toward the arm 51 carrying the corresponding stationary electrode. The adjusting thumb-nuts 99 permit regulation of the tension of the springs 97 to vary the pressure exerted by the movable electrodes upon the work.

Movement of the pivoted arms 58 toward the arms 51 is normally prevented by means of a series of cams 101. There is one of these cams positioned between each pair of arms 51 and 58. The cams 101 are pivotally supported by means of uprights 102.

An arm 103 is secured to each cam 101 and is arranged to make contact with a ring 104 which may be raised and lowered by means of the depending rods 105. Each rod 105 is pivoted to a link 106 which in turn is pivotally connected to an extension 107 mounted to swing with a hand lever 108. Each hand lever 108 is mounted to swing about the axis of a shaft 109. The two levers 108 are interconnected by means of the arms 110 and the connecting link 111 so that when one lever is actuated the other will also be actuated. Movement of either lever therefore will serve to raise or lower the rods 105 depending upon the direction of movement of the lever 108. This will result in a raising or lowering of the ring 104. When the ring 104 is raised it lifts the cam levers 103 and shifts the cams 101 to such position that the arms 58 are separated from the arms 51. Therefore the movable electrodes will be moved out of operative relation with the stationary electrodes.

Each cam arm 103 is connected with the ring 104 by means of a chain 112. These chains are of different lengths, the shortest chain being connected to the ring 104 and cam lever 103 at that part of the machine where the innermost electrode is located. The chains successively increase in length from this innermost chain to the end chains. When the ring 104 is lowered the innermost chain will therefore serve to pull downwardly the innermost cam lever 103 and this will permit the innermost movable electrode to move into operative relation with the stationary electrode. Further downward movement of the ring 104 will successively tighten the chains toward both ends of the series of electrodes and thus permit the movable electrodes to move into operative relation with the stationary electrodes in succession from the central electrode to the extreme electrodes.

The operation of this form of machine will be largely obvious from the above description. The members M to be welded, which in this instance are curved members of an automobile body, are positioned adjacent the semi-circular series of stationary electrodes. Either of the hand levers 108 is then actuated to lower the ring 104, it being understood that in the normal position of the parts this ring is in its raised position. The lowering of the ring 104 will have the effect of bringing the movable electrodes into contact with the work in the manner described above; the center electrode first contacts with the work and then the other electrodes are successively applied toward the two ends of the work. This will prevent wrinkling or buckling of the members, such as might occur if all of the movable electrodes were moved into contact with the work simultaneously. In the present instance the members to be welded are curved and the successive application of the electrodes from one end of the series to the other as described in connection with the other forms of the machine might result in a wrinkling or buckling of the members and therefore the successive application of the electrodes from the center to the extreme electrodes is resorted to. All of the movable electrodes are now yieldingly pressed against the members to be united and each exerts the proper pressure thereon because the corresponding spring may be adjusted for the proper welding pressure.

The hand lever 93 is then actuated to unlock the machine and the hand wheel 77 then turned to rotate the commutator brush 66. The switch carried by the lower end of the shaft 67 will serve to complete the circuit through the primary of the transformer before the brush 66 makes electrical contact with the first commutator segment. Continued rotation of the hand wheel 77 will then cause current to pass through the pairs of electrodes successively. This is due to the fact that the circuit of the secondary of the transformer is completed, by means of the brush 66, from the ring 63 through the successive commutator segments and therefore through the successive movable electrodes and corresponding stationary electrodes.

After all of the welds are effected the pin 90 automatically snaps into the notch 89 and therefore holds the machine locked with the circuit of the primary of the transformer broken by the cut-out portions 86 of the rings 83 and 84 and therefore no energy can be wasted.

When the welding operation is completed either of the hand levers 108 is actuated to raise the ring 104 which then contacts with the cam levers 103 to so shift the cams 101 as to move the movable electrodes out of operative relation with the corresponding stationary electrodes. The welded members may then be removed from the machine.

All of the different forms of the machine herein disclosed are capable of producing a multiplicity of spot welds expeditiously.

The electrodes of one set come in contact with the work in such a manner that wrinkling or buckling of the members to be welded is prevented. As current is passed through the pairs of electrodes successively it is not necessary to use a large current such as would be necessary if current were passed through all of the pairs of electrodes at one time. The breaking of the primary circuit of the transformer after the welding operation and the completion of this circuit just before the welding operation prevents waste of current and therefore minimizes the consumption of electrical energy.

The structure herein shown and described is merely illustrative and many changes may be made without departing from the spirit or scope of the invention as defined in the accompanying claims.

What I claim is:—

1. A spot welding machine comprising a plurality of movable electrodes and means for causing said electrodes to contact with the work in a predetermined succession and be collectively held in operative position relative to the work.

2. A spot welding machine comprising a plurality of movable electrodes and means for causing said electrodes to contact with the work one after another and be collectively held in operative position relative to the work.

3. A spot welding machine comprising a plurality of movable electrodes, means to support a plurality of members to be united so that said movable electrodes may contact with one of said members at different points along the length of the same, and means for causing said electrodes to contact with said member in a predetermined succession and be collectively held in operative position relative to said member.

4. A spot welding machine comprising stationary electrodes adapted to contact with one of a plurality of members to be united, a plurality of movable electrodes adapted to contact with another of said members at different points along the length of the same, and means for causing said movable electrodes to contact with the last named member in a predetermined succession and be collectively held in operative position relative to said member.

5. A welding machine comprising means to support a plurality of members to be united, and means adapted to apply pressure to said members at a plurality of separate points along the length thereof, said means being adapted to apply the pressure to said points in a predetermined succession and to maintain the pressure at each point until the pressure is applied at all of the points.

6. A machine for electrically uniting a plurality of members comprising a plurality of movable electrodes, means to support the members to be united so that said electrodes may contact with one of the members at different points along the length of the same, and means for causing said electrodes to contact with said member in a predetermined succession and be collectively held in operative position relative to said member.

7. A machine for electrically uniting a plurality of members comprising a plurality of stationary electrodes adapted to contact with one of the members to be united, a plurality of movable electrodes adapted to contact with another of said members at different points along the length of the same, and means for causing said movable electrodes to contact with said last named member in a predetermined succession and be collectively held in operative position relative to said member.

8. A spot welding machine comprising a plurality of movable electrodes, means for causing said electrodes to contact with the work in a predetermined succession and be collectively held in operative position relative to the work, and means to supply electric current to said electrodes successively.

9. A spot welding machine comprising a plurality of movable electrodes, means to support a plurality of members to be united so that said movable electrodes may contact with one of said members at different points along the length of the same, means to move said electrodes into contact with said member in a predetermined succession, and means to supply electric current to said electrodes successively.

10. A welding machine comprising stationary electrodes, a plurality of individually movable electrodes, means tending to yieldingly urge the movable electrodes into operative relation with the stationary electrodes, and means acting in opposition to said first named means to control the movement of the movable electrodes and to permit them to be moved into operative relation with the stationary electrodes in a predetermined succession by said first named means.

11. A welding machine comprising stationary electrodes, a plurality of individually movable electrodes, means tending to yieldingly urge the movable electrodes into operative relation with the stationary electrodes, means acting in opposition to said first named means to control the movement of the movable electrodes and to permit them to be moved into operative relation with the stationary electrodes in a predetermined succession by said first named means, and means for passing an electric current through each movable electrode and the corresponding stationary electrode.

12. A welding machine having a plurality of electrodes, means for distributing electric current to said electrodes comprising a stationary commutator, a movable brush coöperating with said commutator, and a switch controlling the supply of current to said brush, said switch having a part movable with said brush.

13. A welding machine comprising a plurality of electrodes, a transformer, means to connect said electrodes successively in circuit with the secondary coil of said transformer, and means operated in timed relation with said first named means to control the circuit of the primary coil of the transformer.

14. A welding machine comprising a plurality of electrodes, a transformer, means to connect said electrodes successively in circuit with the secondary coil of said transformer, and means operated in timed relation with said first named means to complete a circuit through the primary coil of the transformer before any of said electrodes is connected in circuit with said secondary coil.

15. A welding machine comprising a plurality of electrodes, a transformer, means to connect said electrodes successively in circuit with the secondary coil of said transformer, and means operated in timed relation with said first named means to complete a circuit through the primary coil of the transformer before any of said electrodes is connected in circuit with said secondary coil and to break the circuit of the said primary coil before the circuit is broken between the last electrode and said secondary coil.

16. A welding machine comprising a plurality of electrodes, means adapted during one cycle of operations of the machine to distribute electric current to said electrodes, and releasable means to automatically lock the machine in inoperative position after one cycle of operations.

17. A welding machine comprising a plurality of electrodes, means to distribute electric current to said electrodes, and releasable means for normally locking a portion of said first named means in inoperative position.

18. A welding machine comprising a plurality of electrodes, means to distribute electric current to said electrodes, said means comprising a part movable in one direction, and means for positively preventing movement of said part in the reverse direction.

19. A welding machine comprising one set of relatively fixed electrodes, another set of relatively movable electrodes, means for yieldingly urging the electrodes of the second set toward those of the first set, and means to vary the effect of said last named means on the movable electrodes.

20. A welding machine comprising one set of relatively fixed electrodes, another set of relatively movable electrodes, springs for urging the electrodes of the second set toward those of the first set, and means for varying the effect of each of the springs on the corresponding electrode whereby each movable electrode will exert the proper pressure on the work placed between both sets of electrodes.

21. A spot welding machine comprising a plurality of movable electrodes, means for causing said electrodes to contact with the work in a predetermined succession and be collectively held in operative position relative to the work, and means to supply electric current to said electrodes in a predetermined succession after all of the electrodes are in operative position.

22. A welding machine comprising a plurality of electrodes, current distributing means adapted when set in motion to distribute current to said electrodes, releasable means for normally locking said current distributing means against movement, and a switch for controlling the supply of current to the current distributing means, said switch being automatically controlled by the machine so that it is open when the current distributing means is locked against movement and is closed when said current distributing means is set in motion.

23. A welding machine comprising a plurality of electrodes, current distributing means normally in an inoperative position but adapted when set in motion to distribute current to said electrodes, and a switch for controlling the supply of current to said means, said switch being automatically controlled by the machine so that it is open when said current distributing means is in its inoperative position and is closed when the current distributing means is set in motion.

In witness whereof, I have hereunto subscribed my name in the presence of two witnesses.

JOSEPH LEDWINKA.

Witnesses:
L. R. HILYARD,
A. H. BUXBAUM.